(12) United States Patent
Barry et al.

(10) Patent No.: US 7,134,543 B2
(45) Date of Patent: Nov. 14, 2006

(54) CONTAINMENT APPARATUS FOR MULTI-PASS OVENS

(75) Inventors: David Lawrence Barry, Highland Village, TX (US); David Brian Emerson, Coppell, TX (US); William C. Flannigan, San Antonio, TX (US); John D. Kiel, Allen, TX (US); Geoffrey T. Ley, Dallas, TX (US); Thomas E. Lyons, Rio Medina, TX (US); Devang Jitendra Sutaria, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 113 days.

(21) Appl. No.: 10/946,835

(22) Filed: Sep. 22, 2004

(65) Prior Publication Data
US 2006/0063121 A1 Mar. 23, 2006

(51) Int. Cl.
*B65G 43/00* (2006.01)

(52) U.S. Cl. ............... 198/810.03; 198/539; 198/560; 193/2 R; 99/386

(58) Field of Classification Search ............... 198/837, 198/841, 810.03, 534, 536, 539, 560, 562, 198/566; 193/2 R; 99/386, 423, 443 R, 99/443 C
See application file for complete search history.

(56) References Cited

U.S. PATENT DOCUMENTS

| | | | | |
|---|---|---|---|---|
| 1,721,002 A | * | 7/1929 | Cooper | 198/534 |
| 2,709,412 A | * | 5/1955 | Eagerman | 99/352 |
| 3,956,632 A | * | 5/1976 | Hall et al. | 198/810.03 |
| 4,496,037 A | * | 1/1985 | Spamer | 193/2 R |
| 4,715,272 A | * | 12/1987 | Mendoza | 99/339 |
| 5,392,696 A | * | 2/1995 | Navarro et al. | 198/560 |
| 5,749,283 A | * | 5/1998 | Funk | 99/339 |
| 5,836,240 A | | 11/1998 | Kuenen | |
| 5,996,476 A | * | 12/1999 | Schultz | 99/349 |
| 6,195,518 B1 | * | 2/2001 | Bennett et al. | 198/810.03 |

* cited by examiner

*Primary Examiner*—James R. Bidwell
(74) *Attorney, Agent, or Firm*—Carstens & Cahoon, LLP; Colin P Cahoon; William S. Wang

(57) ABSTRACT

A containment apparatus for a multi-pass oven consisting of guide rails and tapered guide chutes having side rails. A tapered guide chute directs product pieces from one conveyor to the center of a receiving region of an underlying conveyor. Guide rails are placed along the sides of the receiving region of an underlying conveyor and maintain baking product pieces on the conveyor. Diverters on the distal end of each guide rail further move product pieces toward the center of the conveyor. Such diverters help ensure that pieces reach a subsequent guide chute or subsequent conveyor without falling off of the conveyor. Such guide rails, diverters, and guide chutes help prevent damage to, and loss of, product pieces while pieces pass through the oven. Guide rails, diverters, and guide chutes are particularly effective at maintaining round or cylindrical pieces within a multi-pass oven.

6 Claims, 4 Drawing Sheets

CONTAINMENT APPARATUS FOR MULTI-PASS OVENS

BACKGROUND OF THE INVENTION

1. Technical Field

The present invention relates to improvements to multi-pass ovens and associated conveyor systems. More particularly, the invention relates to product centering and handling components which may be added to such systems to facilitate their operation. A product-centering apparatus ensures that products are maintained on conveyors within multi-pass ovens. Flanged slides help guide comestible products moving from one conveyor down to another conveyor as product pieces passes through a multi-pass oven.

2. Description of Related Art

Snack pieces and other edible baked goods are known to be prepared with the use of multi-pass ovens. While in these ovens, pieces are moved about on conveyors and pass from one conveyor to another in various ways. Conveyors are usually stacked one above another and rotate in a countercurrent direction. Generally, relatively flat pieces remain stationary while being processed on such conveyors and while being handled and eventually packaged. No special handling is necessary to maintain the bulk of the product within the confines of process equipment. Such pieces remain on the equipment even when conveyors in an oven exhibit pronounced lateral movements due to irregular heating and other process imperfections.

However, certain product pieces are round or tubular and thus can move about during processing on conveyors, chutes and other equipment. These products have a stronger tendency to move around during processing as compared to relatively flat pieces. As conveyors continuously operate in a multi-pass arrangement, pieces reach the end of one conveyor and pass to an underlying subsequent conveyor by means of a chute or ramp. The chute imparts a forward motion to pieces which allows them to escape the process by rolling or bouncing off the sides or end of prior art conveyors.

In other circumstances, a piece may become entangled in stationary parts at the edge of a conveyor as a result of such movement. Propelled pieces may also end up sufficiently close to the edge of a conveyor so as to be lost from the sides of a chute as such pieces reach the end of a conveyor and are impelled against a chute. In these circumstances, there is an elevated risk of losing product, causing a defect in a product, or worse, stopping the system because of a malfunction when pieces are passed vertically from one conveyor to the next. Lost pieces may even serve as a fire hazard within an oven as pieces are exposed to sufficient heat to cause self-combustion.

FIG. 1 shows an embodiment of a prior art multi-pass oven. There are multiple conveyors 102, 122 turning counter-currently in an oven 120. In a multi-pass arrangement of conveyors 130, several conveyors 102 are stacked one above another. Each conveyor 102 turns around two or more axles 104. Each conveyor 102 generally turns in a different direction from the one above or below it. With multiple conveyors 102 within an oven 120, product pieces 106 are able to reside longer within the oven 120. Alternatively, a higher rate of production is possible in a multi-pass oven as conveyors can operate faster while maintaining a desired bake time. Operating conveyors at higher speeds impels pieces with a higher velocity thereby increasing the risk of losing processing pieces.

With reference to FIG. 1, once pieces 106 reach the end of a first conveyor 102, they fall 110 or are guided by chutes 124 to a product-receiving region 108 of a subsequent conveyor 122. Pieces passing to a subsequent conveyor 122 may end up traveling closer to the edge of a subsequent conveyor 122 and thus may be at a greater risk of eventually rolling or bouncing off of a subsequent conveyor 122. After passing to a subsequent conveyor 122, some pieces 112 may be immediately at risk for falling off of the conveyors.

A need exists for maintaining processing pieces 106 within the confines of conveyors within a multi-pass arrangement of conveyors. A need exists for guardrails or guide rails along the sides of a conveyor 102. Such side guards would maintain conveyed product pieces 106 on a conveyor. Such guide rails would ensure that product pieces 106 which are prone to movement during processing are maintained in the most central region of each conveyor. Further, a need exists for an improved chute. Such chutes would have guide rails which would help maintain product pieces within the confines of product chutes as product pieces 110 move from one conveyor to the next.

Such guide rails and improved chutes would substantially reduce the risk that conveyed pieces 106 are lost from, or cause a malfunction of, the conveyors during operation. Such guide rails and chutes would also reduce damage that can occur to product pieces 106. Such guide rails and chutes would not impede the movement of the conveyors and would be able to adjust as the conveyors exhibited random and lateral movements during operation. Such guide rails would not substantially impede monitoring of conveyed pieces and would be relatively inexpensive to produce and easy to install. Finally, such guide rails and chutes would substantially improve the safe operation of a multi-pass oven used to process product pieces which are prone to moving relative to a conveyor surface.

SUMMARY OF THE INVENTION

In accordance with the present invention, a containment apparatus consists of guide rails and guide chutes. Guide rails are placed along the sides of a conveyor within a multi-pass oven. Guide rails lie parallel to a conveyor and direct moveable baking product pieces toward the center region of it. Guide rails are attached to an undermount guide which allows the containment apparatus to track the lateral movements of an operating conveyor. Such guide rails can have narrowing protrusions or diverters toward the distal end of each guide rail. Guide chutes having guide rails direct product pieces to a subsequent underlying conveyor which generally turns in the opposite direction as the previous one. Such guide chutes direct product pieces toward the center of a subsequent conveyor. Such guide rails and guide chutes help prevent damage to, and loss of, product pieces while the pieces pass through the oven. Guide rails and guide chutes are particularly effective at preventing round or cylindrical pieces from migrating relative to conveyors during processing. Such guide rails and guide chutes provide increased safety to an operating multi-pass oven. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives, and advantages thereof, will be best understood by reference to the following detailed description of illustrative embodiments when read in conjunction with the accompanying drawings, wherein:

Figure 1:
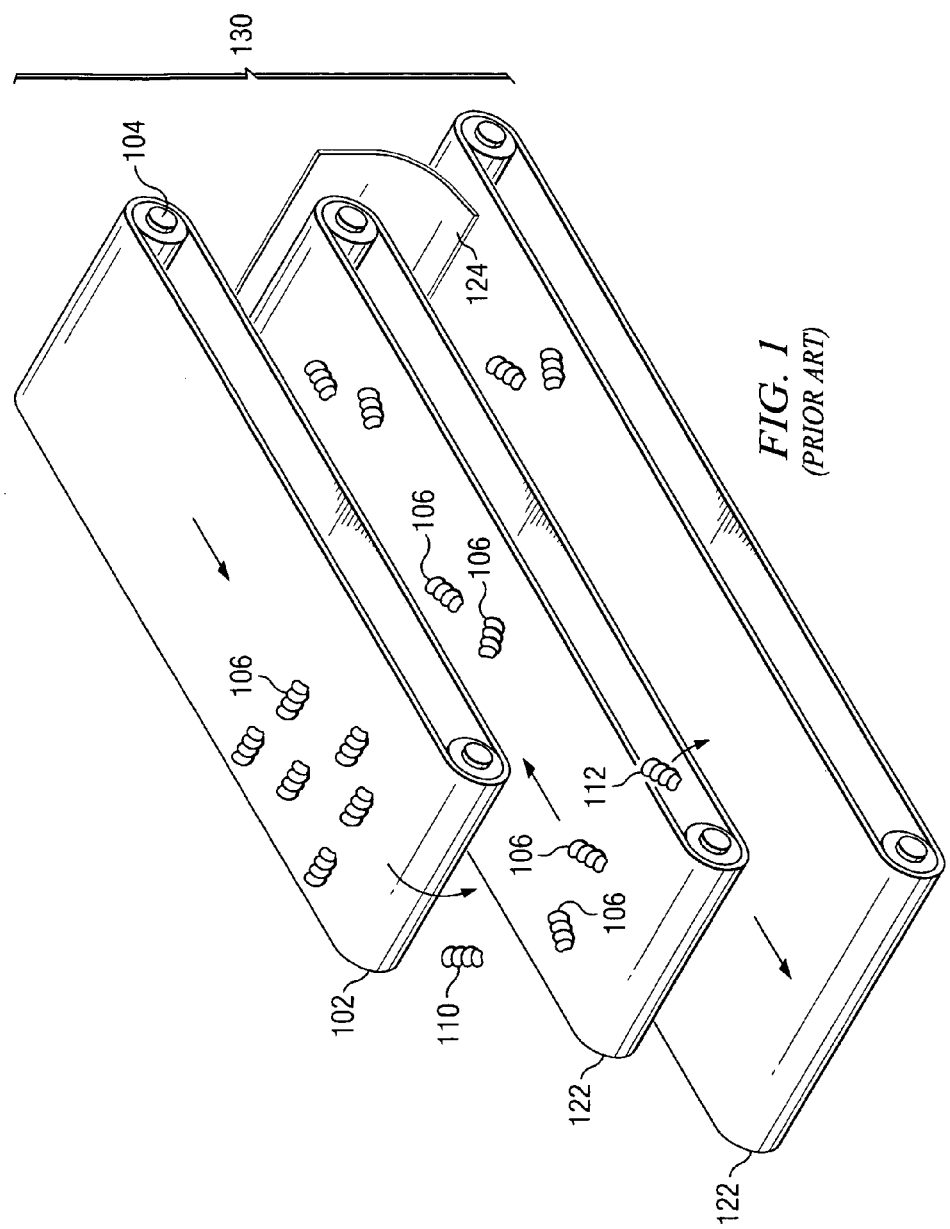
FIG. 1 is a perspective drawing of a multi-pass oven according to the prior art wherein several conveyors turn in a counter-current direction relative to one another.

REFERENCE NUMERALS 102 conveyor
104 conveyor axle
106 product piece
108 product-receiving region of conveyor
110 falling product piece
112 at-risk product piece
120 multi-pass oven
122 subsequent conveyor
124 prior art chute
130 multi-pass arrangement of conveyors
202 guide rails
204 undermount guide
210 vertical portion of guide rail
212 eye nut connecting link
216 large socket head cap screw
220 D shackle
224 eye nut
230 securing nut
240 wear strip
250 extension link
252 screw hole
254 threaded hole screw
256 socket head cap screw
260 extension oven guide
262 adjustable diverter
280 connecting link mounting bracket
290 conveyor frame
310 guide chute
312 connecting section of guide chute
314 chute handles
316 product guiding surface of guide chute
318 guide chute side rail
320 retaining lip
322 distal end of guide chute
324 proximal end of guide chute
330 guide chute support member

DETAILED DESCRIPTION

A containment apparatus in the form of guide rails and improved chutes optimally maintain product pieces on a set of multi-pass conveyors. Such a containment apparatus is particularly effective with product pieces which have a tendency to migrate during processing, such as but not limited to round or cylindrical pieces.

Figure 3:
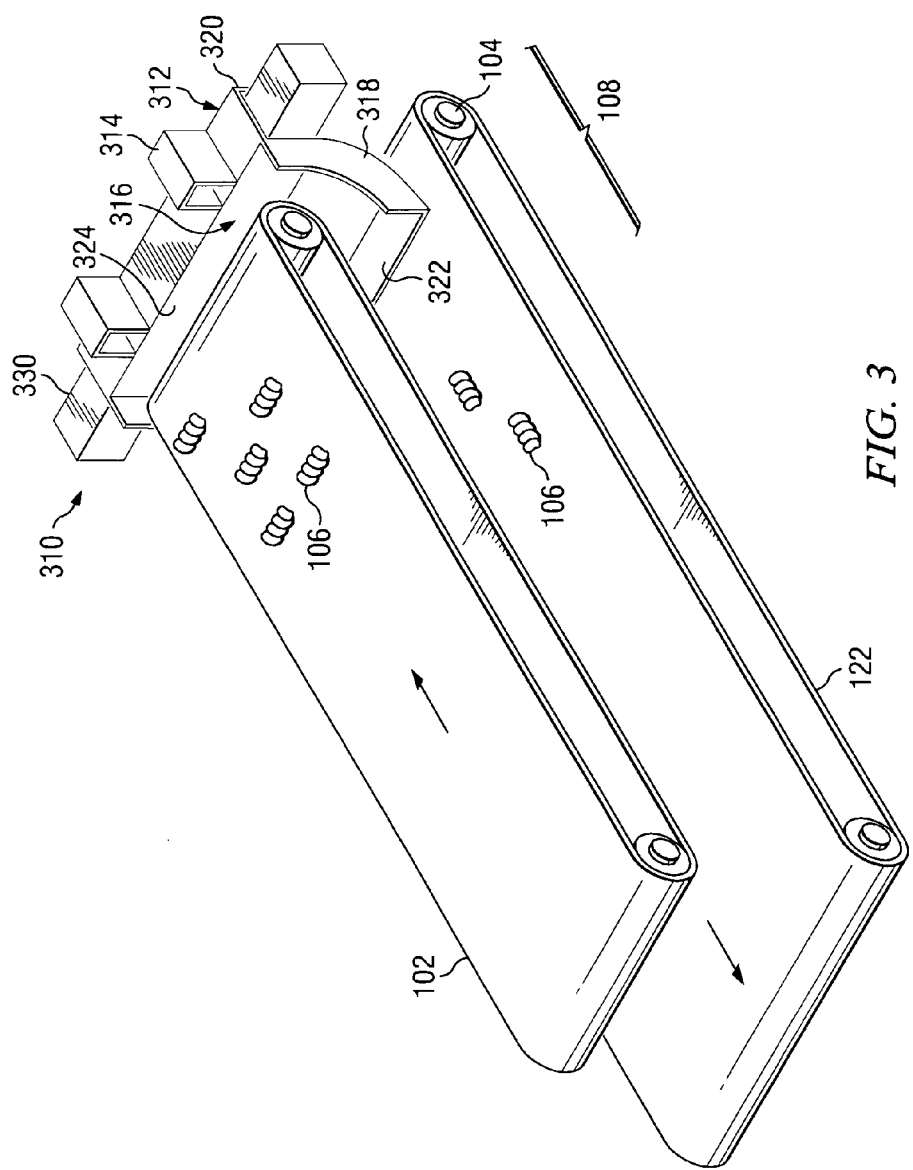

According to one embodiment of the invention, and with reference to FIG. 3, product pieces are passed from a first conveyor 102 to subsequent conveyors 122 by a guide chute 310. A guide chute 310 has improvements over the prior art. When product pieces 106 reach the distal end of a conveyor, the pieces 106 fall a certain distance before contacting a product guiding surface 316 of a guide chute 310. Such a guide chute 310 directs falling pieces 110 onto the center region of a subsequent conveyor 122. Preferably, there is at least one guide chute 310 at the end of each conveyor. However, multiple guide chutes 310 may be used to cover the entire width of a given conveyor. In one embodiment, a guide chute 310 has one or more handles 314 which facilitate installation and handling of guide chutes 310. In addition, each guide chute 310 has a retaining lip 320 curled downward on which a guide chute 310 may be attached to a guide chute support member 330. Such support member 330 can be attached to a conveyor frame 290 for support.

Each guide chute 310 further comprises a connecting section 312, a product guiding surface 316, and side rails 318. The side rails 318 are of sufficient size so as to prevent nearly all product pieces from escaping the guide chute 310. The length of a connecting section 312 and a product guiding surface 316 depend upon the preferences of the designers or fabricators of the guide chute 310. The shapes and dimensions of a connecting section 312 and a product guiding surface 316 are arbitrary and may depend on several factors including, but not limited to, the type and shape of piece 106 processed in the oven, the size and width of each conveyor, the distance between conveyors, and the position and orientation of each guide chute 310 relative to the conveyors. In a preferred embodiment, a product guiding surface 316 is curved. The amount of curvature of such product guiding surface 316, and the dimensions and shape of guide chute side rails 318 are likewise arbitrary but may be optimized for production of a given product piece 106 and for a given multi-pass oven.

Some experimentation may be necessary to determine the optimal dimensions of each component of a guide chute 310. Guide chute side rails 318 are generally perpendicular to the surface of a conveyor 122 but may be of an arbitrary shape and dimension. In a preferred embodiment, a guide chute 310 is made of metal; however, a guide chute 310 may be made of other materials that can persist in the elevated temperatures of an oven. The surface of a product guiding surface 316 may be smooth, textured, or shaped with surface features such as, but not limited to, ridges, bumps, or channels which facilitate the transfer, or alternatively, slow the transfer, of product pieces 106 from a guide chute 310 to a subsequent conveyor 122. In a preferred embodiment, the top portion or proximal end 324 of a guide chute 310 is wider than the width of a conveyor 102, and the distal end 322 of the product guiding surface 316 is narrower or smaller than the width of a subsequent conveyor 122. Such tapering of a guide chute 310 more preferentially guides processed pieces 106 to the center region of a subsequent conveyor 122. In one example, where the width of a conveyor is about 39 inches, the tapering is about two inches on each side of the guide chute 310.

Figure 2:
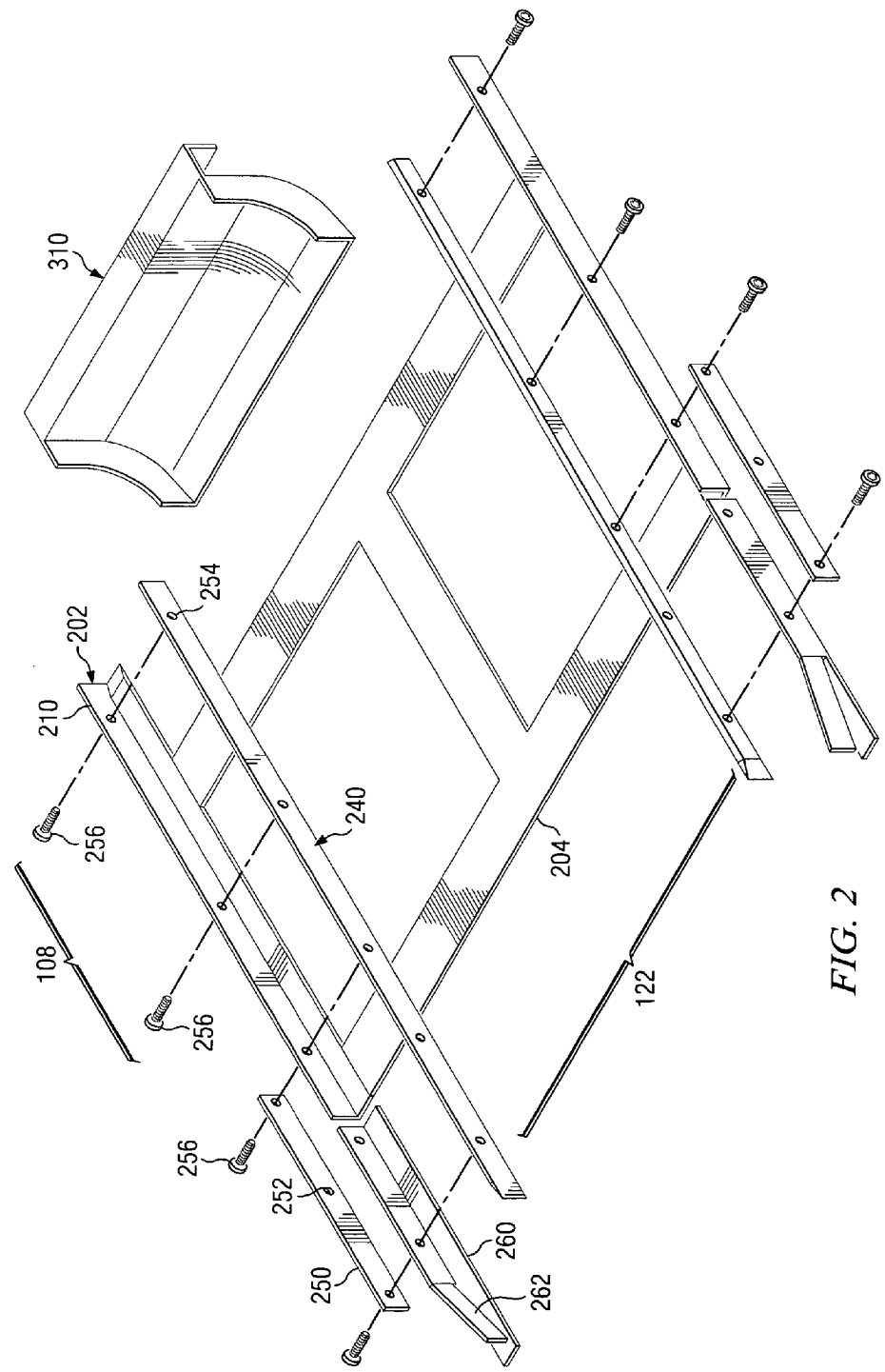
FIG. 2 is a perspective drawing of guide rails including extension oven guides and undermount guide and connecting links.

According to the present invention, after product pieces leave a guide chute, the pieces are maintained on a conveyor with guide rails. Guide rails according to one embodiment of the invention are shown in FIG. 2. Guide rails 202 lie substantially parallel to a subsequent conveyor 122. Guide rails 202 may be of any length, but preferentially lie adjacent to a product-receiving region 108 of a subsequent conveyor 122 whereupon product pieces 106 are first introduced to a subsequent conveyor 122 from a guide chute 310. A product-receiving region 108 is about the distance necessary for a product piece 106 to lose its forward motion relative to a conveyor. Forward motion is received from the acceleration of gravity when a product piece 106 falls down a guide chute 310. For example, in one embodiment where the length of an entire conveyor is 17 feet, guide rails along a product-receiving region are about 3 to 4 feet in length. At the end of a product-receiving region 108, a product piece 106 is again stationary on a conveyor and has almost no tendency to move. Guide rails 202 are preferably used along each conveyor in a multi-pass oven and preferably at a product-receiving region 108 of each conveyor.

Guide rails 202 are attached to an undermount guide 204. An undermount guide 204 may be of any shape as long as it connects and provides stability to guide rails 202. In one embodiment as shown in FIG. 2, the undermount guide 204 is in the shape of an "H". An undermount guide 204 may have contact with a conveyor and may be exposed to wear over time. An undermount guide 204 allows guide rails 202 to track the lateral and other movements of a conveyor.

One or more wear strips 240 are attached with socket head cap screws 256 to the inside surface of the vertical portion 210 of each guide rail 202. Threaded holes 254 in the wear strips 240 ensure that the socket head cap screws 256 remain in place. Wear strips 240 are in direct but loose or intermittent contact with the sides of a conveyor 102. Intermittent and sometimes continuous contact with the conveyor 102 causes wear to wear strips 240. After a certain time, worn wear strips 240 may be replaced with new ones. Wear strips 240 may be made of any material suitable for use in an oven and suitable to resist wear by contact with a conveyor 102. In a preferred embodiment, wear strips 240 are made of low-grade carbon steel.

Extension oven guides 260 are attached to each end of each guide rail 202. The vertical side of each extension oven guide 260 is sandwiched between an extension link 250 and a wear strip 240. Extension links 250 can be made of metal or other strong, supportive material. Extension links 250 provide support and a means for attachment to an undermount guide 204. Additional socket head cap screws 256 passing through holes 252 in each extension oven guide 260 ensure that each extension oven guide 260 remains firmly in place. Each extension oven guide 260 has a diverter 262 angled inward to ensure that product pieces 106 passing near the edges on a conveyor 102 are pushed or guided toward the center of the conveyor 102. The diverters 262 can be adjustable or bendable, if desired. The diverters 262 are made to protrude above the surface of a conveyor 102 such that they are not in contact with the conveyor 102 but are sufficiently close so as to contact product pieces 106 within their reach. In a preferred embodiment, the combination of a guide chute 310, a guide rail 202, and a diverter 262 maintains product pieces 106 within a multi-pass oven.

Figure 2A:
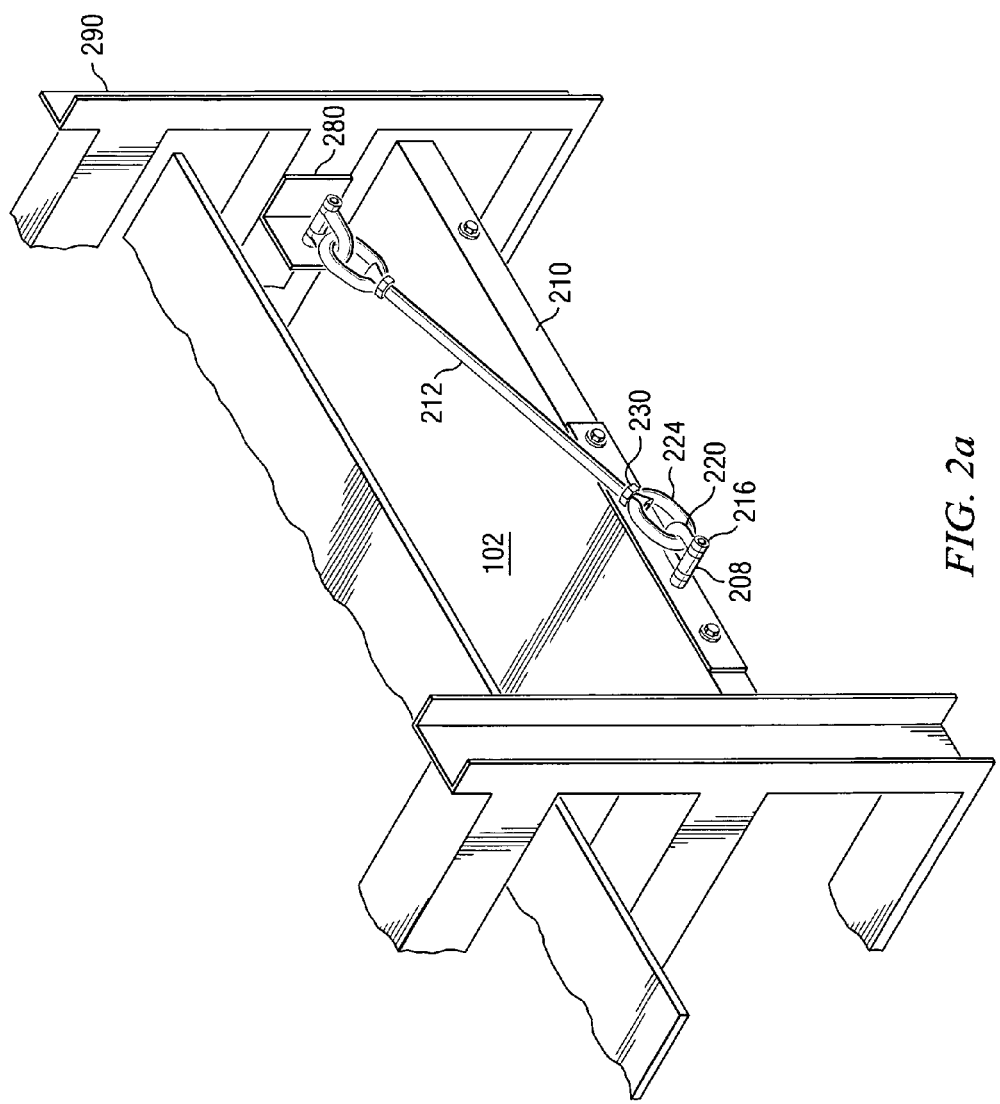
FIG. 2a is a close-up perspective drawing of the linkage between guide rails and an eye nut connecting link; and, FIG. 3 is a perspective drawing of a guide chute having guide rails and a tapered discharge which facilitates the transfer of product pieces from one conveyor to the center region of another.

With reference to FIG. 2, a containment apparatus with guide rails 202 is maintained in close proximity to a conveyor 102 by placing an undermount guide 204 beneath the conveyor 102. Attached to the undermount guide 204, usually by welding, are two guide rails 202, one on each side the conveyor 102. With reference to FIG. 2a, an eye nut connecting link 212 is attached to each end of each guide rail 202. Each eye nut connecting link 212 has an eye nut 224 by which the link 212 is connected by way of a D shackle 220 to a guide rail 202. Each eye nut connecting link 212 is so attached to a guide rail 202 by a large socket head cap screw 216 which holds a D shackle 220 and one or more spacers 208. On the other end, each eye nut connecting link 212 is attached to the conveyor frame 290 by a connecting link mounting bracket 280. The connecting link mounting bracket 280 is welded to the conveyor frame 290. However, other connecting means may be used to connect each bracket 280 to the conveyor frame 290, such as but not limited to a chain or cable. Each connecting link mounting bracket 280 has similar connecting components as those used to connect the eye nut connecting link 212 to the containment apparatus. Specifically, a large socket head cap screw 216 passes through a connecting link mounting bracket 280 and such screw 216 holds a D shackle 220 and one or more spacers 208.

Each securing nut 230 on each end of an eye nut connecting link 212 can be adjusted so as to obtain an optimum amount of tension in each connection. The connection of the containment apparatus is optimum when it provides enough flexibility or slack for the containment apparatus to track the lateral and other movements of an operating conveyor 102 while still maintaining the containment apparatus in a roughly stationary position relative to the conveyor 102.

During operation, a conveyor 102 drifts laterally or side-to-side, thus a guide rail rigidly fixed to a conveyor frame 290 would not be preferred because the conveyor 102 could be damaged and could cause maintenance downtime if the conveyor 102 were to entangle itself with such a rigidly fixed guide rail. In the present invention, there is minimal risk that a conveyor would become entangled with a guide rail. Such entanglement would require shutdown and replacement of damaged parts. Also, such a rigidly-mounted guide rail would not always be in close enough proximity to maintain product pieces on a conveyor.

Further, it is not preferred to attach a guide rail to a conveyor frame 290 with a springing material which could maintain a guide rail against the side of a conveyor 102. Many springing materials available for such an attachment of a guide rail would not allow free enough movement due to thermal expansion of the materials within the oven. Guide rails 202 according to the present invention have the ability and benefit to optimally track the lateral movement of a conveyor 102 without creating excessive friction and/or damage to the sides of the conveyor 102. Such guide rails 202 do not leave gaps between a conveyor 102 and a guide rail 202 of such size through which product may be lost.

Some, and preferably most, of the weight of the containment apparatus is supported by the undermount guide 204. The eye nut connecting links 102 are designed to be under a tension load as the conveyor 102 operates. Further, the eye nut connecting links 102 may be attached to the conveyor frame 290 at a point either above or below the plane of the conveyor 102. In FIG. 2, the attachments are shown above the plane of the conveyor 102.

Through the use of a combination of one or more guide rails 202 and one or more guide chutes 310, product pieces 106 are maintained on conveyors in a multi-pass oven. Without guide chutes 310, guide rails 202, and diverters 262, there is a substantial likelihood of losing product pieces 106 from the apparatus. Product pieces 106 which have fallen off of a conveyor 102 inside of a multi-pass oven have the potential to self-combust. If a sufficient amount of lost particles combust, there is a potential for starting a fire in the oven which can lead to a process emergency and loss of life. Guide rails 202, guide chutes 310, and diverters 262 are especially advantageous in the production of round or cylindrical process particles which have a tendency to migrate on conveyors during production.

While the invention has been particularly shown and described with reference to a preferred embodiment, it will be understood by those skilled in the art that various changes in form and detail may be made therein without departing from the spirit and scope of the invention.

We claim:

1. A containment apparatus for a conveyor in a multi-pass oven comprising at least one guide rail wherein said guide rail is held in close proximity to said conveyor by an undermount guide, and further wherein said containment apparatus tracks the lateral movement of said conveyor; said containment apparatus further comprising an extension oven guide attached to at least one of said undermount guide or said guide rail; and further wherein said extension oven guide has at least one diverter that can be extended over the surface of said conveyor.

2. A containment apparatus for a conveyor in a multi-pass oven comprising at least one guide rail wherein said guide rail is held in close proximity to said conveyor by an undermount guide, and further wherein said containment apparatus tracks the lateral movement of said conveyor; said containment apparatus further comprising an extension oven guide attached to at least one of said undermount guide or said guide rail; and said containment apparatus further comprising an extension link wherein one end of said extension link is attached to said extension oven guide, and the opposing end of said extension link is attached to at least one of said undermount guide or said guide rail.

3. A guide chute for a conveyor in a multi-pass oven comprising a tapered product guiding surface having a larger proximal end and a smaller distal end, and two side rails, further comprising at least one guide rail and at least one wear strip wherein said guide rail is held in close proximity to a conveyor by an undetmount guide, and further wherein said guide rail tracks the lateral movement of said conveyor.

4. A multi-pass oven comprising:
a) a first conveyor;
b) at least one subsequent conveyor;
c) at least one guide rail wherein said guide rail is held in close proximity to said subsequent conveyor of step b), further wherein said guide rail is attached to an undermount guide, and further wherein said guide rail tracks the lateral movement of said conveyor; and,
d) at least one guide chute having a tapered product guiding surface and at least one side rail.

5. The apparatus of claim 4 further comprising at least one wear strip attached to each of said guide rails.

6. The apparatus of claim 4 wherein said guide rail and said undermount guide are held relatively stationary by a connecting member further wherein said connecting member is attached to at least one of said guide rail and said undermount guide on one end, and attached to a stationary object on the other end.

* * * * *

UNITED STATES PATENT AND TRADEMARK OFFICE
CERTIFICATE OF CORRECTION

| | | |
|---|---|---|
| PATENT NO. | : 7,134,543 B2 | Page 1 of 1 |
| APPLICATION NO. | : 10/946835 | |
| DATED | : November 14, 2006 | |
| INVENTOR(S) | : David Lawrence Barry et al. | |

It is certified that error appears in the above-identified patent and that said Letters Patent is hereby corrected as shown below:

Column 8, Line 4, please correct mistyped word:

delete the word "undetmount"

and replace it with --undermount--

Signed and Sealed this

Ninth Day of January, 2007

JON W. DUDAS
*Director of the United States Patent and Trademark Office*